(12) United States Patent
Etzbach et al.

(10) Patent No.: US 6,346,609 B1
(45) Date of Patent: Feb. 12, 2002

(54) CATIONIC AZO-DYES

(75) Inventors: Karl-Heinz Etzbach, Frankenthal; Torsten Freund, Limburgerhof; Rainer Tresch, Maxdorf, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/807,999

(22) PCT Filed: Oct. 30, 1999

(86) PCT No.: PCT/EP99/08274

§ 371 Date: May 4, 2001

§ 102(e) Date: May 4, 2001

(87) PCT Pub. No.: WO00/27929

PCT Pub. Date: May 18, 2000

(30) Foreign Application Priority Data

Nov. 5, 1998 (DE) .......................................... 198 51 026

(51) Int. Cl.⁷ ..................... C09B 35/023; C09B 35/025; C09B 35/031; C09B 44/02; C09B 67/22
(52) U.S. Cl. ................... 534/608; 534/677; 534/688; 534/757; 534/806; 534/829; 534/830; 534/DIG. 3; 8/639
(58) Field of Search .................... 534/677, 688, 534/608, 757, 829, 830, 806; 8/639

(56) References Cited

U.S. PATENT DOCUMENTS 3,957,752 A * 5/1976 Renfrew ..................... 534/615

FOREIGN PATENT DOCUMENTS

| DE | 2160590 | * | 6/1973 |
| DE | 2218645 | * | 10/1973 |
| EP | 162409 | * | 11/1985 |

* cited by examiner

*Primary Examiner*—Fiona T. Powers
(74) *Attorney, Agent, or Firm*—Oblon, Spivak, McClelland, Maier & Neustadt, P.C.

(57) ABSTRACT

Cationic azo dyes of the general formula I

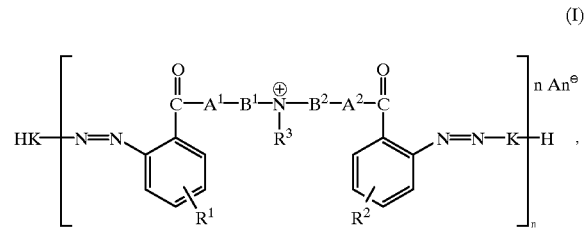

where $R^1$, $R^2$, $R^3$, $A^1$, $A^2$, $B^1$, $B^2$, $An^\ominus$, n and K have the meaning given in the specification are prepared and used for the dyeing and printing of natural or synthetic substrates and mixtures thereof.

9 Claims, No Drawings

CATIONIC AZO-DYES

The present invention relates to cationic azo dyes of the general formula I

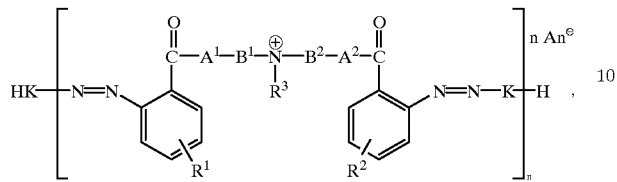

where
R$^1$ and R$^2$ are independently hydrogen, nitro, halogen, C$_1$–C$_6$-alkyl,
R$^3$ is hydrogen, C$_1$–C$_6$-alkyl with or without interruption by 1 or 2 nonadjacent oxy, imino, C$_1$–C$_6$-alkylimino groups or by a

radical,
A$^1$ and A$^2$ are independently oxy, imino or substituted or unsubstituted C$_1$–C$_6$-alkylimino,
B$^1$ and B$^2$ are independently C$_1$–C$_6$-alkylene with or without interruption by 1 or 2 nonadjacent oxy, imino, substituted or unsubstituted C$_1$–C$_6$-alkylimino groups or by a

radical,
An$^\ominus$ is the equivalent of an anion,
n is 1, and
K is the radical of a coupling component or the radical of a monoazo dye of the formula

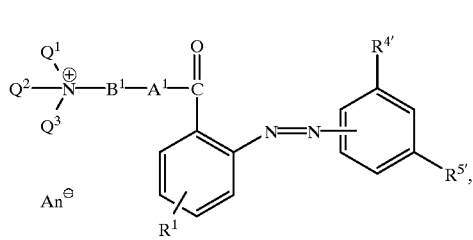

where
R$^{4'}$ and R$^{5'}$ are independently hydroxyl, amino, morpholino or mono- or di(C$_1$–C$_6$)alkylamino, whose alkyl radicals are unsubstituted or substituted by hydroxyl, amino, cyano, C$_1$–C$_6$-alkoxycarbonyl, carbamoyl or mono- or di(C$_1$–C$_6$)alkylcarbamoyl and uninterrupted or interrupted by oxy, and
Q$^1$, Q$^2$ and Q$^3$ are independently hydrogen, C$_1$–C$_{10}$-alkyl with or without interruption by from 1 to 4 nonadjacent oxy, imino and substituted or unsubstituted C$_1$–C$_4$-alkylimino groups and with or without hydroxyl, halogen or phenyl substitution, or Q$^1$ and Q$^2$ combine with the linking nitrogen atom to form a 5- or 6-membered heterocyclic radical which optionally contains nitrogen or oxygen as further hetero atom,
and additionally n is from 2 to 8 when K is the radical of a coupling component of the formula IIIa'

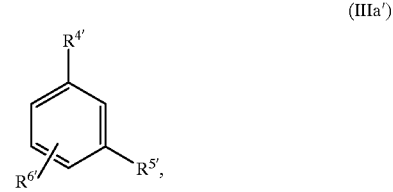

where
R$^{6'}$, is hydrogen, C$_1$–C$_6$-alkoxy with or without oxy interruption in its alkyl radical, mono- or di(C$_1$–C$_6$) alkylamino, C$_1$–C$_6$-alkoxycarbonyl, carbamoyl, mono- or di(C$_1$–C$_6$)alkylcarbamoyl, sulfamoyl, mono- or di(C$_1$–C$_6$)alkylsulfamoyl,
processes for their preparation, their use for dyeing and printing natural or synthetic substrates and also their mixtures.

DE-A-2 218 645 describes water-insoluble trisazo pigments which are monoazo dyes linked via triethanolamine.

DE-A-2 160 590 describes anthranilic acid derivatives bridged with a diethanolamine via the ester group. These diamines are useful for preparing polyurethanes.

It is an object of the present invention to provide novel dyes which have advantageous application properties, especially high affinities for the substrates used, and also good fastness to bleeding and lightfastness.

We have found that this object is achieved by the dyes of the formula I which are defined at the beginning.

Alkyl and alkylene appearing in the abovementioned formula may be straight-chain or branched.

Substituted alkyl appearing in the abovementioned formula may have as substituents for example hydroxyl and methoxy. The number of substituents in the substituted alkyl is generally 1 or 2.

Q$^1$ and Q$^2$ combining with the joining nitrogen atom to form a 5- or 6-membered heterocyclic radical which optionally contains nitrogen or oxygen as further hetero atom may be saturated radicals such as pyrrolidinyl, piperidinyl, morpholinyl, piperazinyl with or without methyl, ethyl, propyl, isopropyl, n-butyl, isobutyl, sec-butyl, 2-hydroxyethyl or 2- or 3-hydroxypropyl substitution on the nitrogen. Further possibilities are unsaturated radicals such as pyrrolyl, pyrazolyl, oxazolyl, isooxazolyl or imidazolyl with or without methyl, ethyl, propyl or butyl substitution in 2- and/or 4-position or N-3(C$_1$–C$_4$)alkylimidazolyl with or without methyl, ethyl, propyl or butyl substitution in 2- and/or 4-position.

Halogen is fluorine, chlorine or bromine.

R$^1$, R$^2$, R$^3$, Q$^1$, Q$^2$ and Q$^3$ are each for example methyl, ethyl, propyl, isopropyl, butyl, isobutyl, sec-butyl, tert-butyl, pentyl, isopentyl, neopentyl, tert-pentyl, hexyl or 2-methylpentyl.

R$^3$, Q$^1$, Q$^2$ and Q$^3$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 4-methoxybutyl, 2- or 4-ethoxybutyl, 3,6-dioxaheptyl, 3,6-dioxaoctyl, 3,7-dioxaoctyl, 4,7-dioxaoctyl, N,N-dimethylaminoethyl, N,N-diethylaminoethyl, 3-(N,N-dimethylamino)propyl, 3-(N,N-diethylamino)propyl, 2-methylaminoethyl, 2-ethylaminoethyl, 3-propylaminoethyl, 2- or 3-methylaminopropyl, 2- or 3-ethylaminopropyl or 2- or 3-propylaminopropyl.

$Q^1$, $Q^2$ and $Q^3$ may each also be for example heptyl, octyl, 2-ethylhexyl, isooctyl, nonyl, isononyl, decyl (the above designations isooctyl, isononyl and isodecyl are trivial names derived from the alcohols obtained by the oxo process - cf. Ullmanns Encyklopädie der technischen Chemie, 4th edition, volume 7, pages 215 to 217, and also volume 11, pages 435 and 436), 2-hydroxyethyl, 2- or 3-hydroxypropyl, 2- or 4-hydroxybutyl, 2-chloroethyl, 2- or 3-chloropropyl, 2- or 4-chlorobutyl, benzyl, 1- or 2-phenylethyl, 2- or 3-butoxypropyl, 2- or 4-propoxybutyl, 4,8-dioxadecyl, 3,7-dioxanonyl, 4,7-dioxanonyl, 2- or 4-butoxybutyl, 3,6,9-trioxadecyl, 3,6,9-trioxaundecyl, 3,6,9-trioxadodecyl, 3,6,9,12-tetraoxatridecyl, 3,6,9,12-tetraoxatetradecyl, 4-hydroxy-2-methyl-3-azabutyl, 4-hydroxy-3-hydroxymethyl-2-methyl-3-azabutyl, 5-hydroxy-2-methyl-3-azapentyl, 5-hydroxy-3-(2-hydroxyethyl)-2-methyl-3-azapentyl, 8-hydroxy-2-methyl-3-aza-6-oxaoctyl, 11-hydroxy-2-methyl-3-aza-6,9-dioxaundecyl, 8-hydroxy-(5-hydroxy-3-oxapentyl)-2-methyl-3-aza-6-oxaoctyl or 11-hydroxy-3-(8-hydroxy-3,6-dioxaoctyl)-2-methyl-3-aza-6,9-dioxaundecyl, N,N-dipropylaminoethyl, N,N-dibutylaminoethyl,3-(N,N-dipropylamino)propyl or 3-(N,N-dibutylamino)propyl.

A is for example methylimino, ethylimino, propylimino, isopropylimino, butylimino, isobutylimino, sec-butylimino, tert-butylimino, pentylimino, isopentylimino, neopentylimino, tert-pentylimino, hexylimino or 2-methylpentylimino.

$B^1$ and $B^2$ are each for example methylene, ethylene, 1,2- or 1,3-propylene, 1,2-, 2,3- or 1,4-butylene, $(CH_2)_2O(CH_2)_2$, $(CH_2)_3O(CH_2)_2$, $(CH_2)_3O(CH_2)_3$, $(CH_2)_2O(CH_2)_2O(CH_2)_2$, $(CH_2)_2NH(CH_2)_2$, $(CH_2)_3NH(CH_2)_2$, $(CH_2)_2NH(CH_2)_2NH(CH_2)_2$,

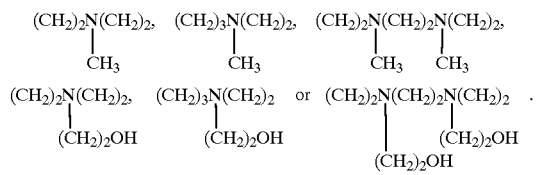

$An^\ominus$, the equivalent of an anion, is derived for example from the following anions: fluoride, chloride, bromide, iodide, sulfate, phosphate, formate, acetate, propionate, mono-, di- or trichloroacetate, lactate, methoxyacetate, citrate, succinate, methanesulfonate, benzenesulfonate, 2- or 4-methylbenzenesulfonate or naphthalenesulfonate.

Suitable coupling components KH are compounds of the benzene, naphthalene, quinolene, pyridone, barbituric acid or pyrazolone series and correspond for example to the compounds of the formulae III a–f

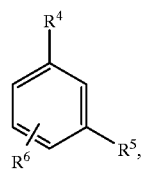 (IIIa)

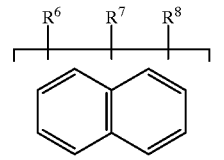 (IIIb)

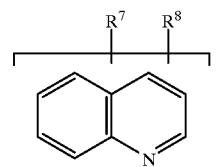 (IIIc)

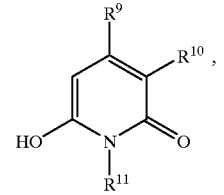 (IIId)

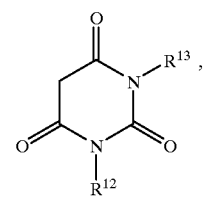 (IIIe)

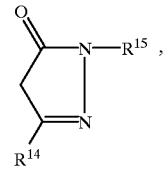 (IIIf)

where
$R^4$ is hydroxyl, amino, morpholino, mono- or di($C_1$–$C_6$) alkylamino whose alkyl radicals are unsubstituted or substituted by hydroxyl, amino, cyano, $C_1$–$C_6$-alkoxycarbonyl, carbamoyl or mono or di($C_1$–$C_6$) alkylcarbamoyl and are uninterrupted or interrupted by oxy or is $C_1$–$C_6$-alkoxy, $R^5$ is hydrogen, $C_1$–$C_6$-alkyl or $R^4$, $R^6$ is hydrogen, $C_1$–$C_6$-alkyl, $C_1$–$C_6$-alkoxy with or without oxy interruption in its alkyl radical, mono or di($C_1$–$C_6$)alkylamino, $C_1$–$C_6$-alkoxycarbonyl, carbamoyl, mono or di($C_1$–$C_6$)alkylcarbamoyl whose alkyl radicals are unsubstituted or substituted by hydroxyl or amino and are uninterrupted or oxy interrupted, sulfamoyl, mono or di($C_1$–$C_6$) alkylsulfamoyl whose alkyl radicals are unsubstituted or hydroxyl or amino substituted and uninterrupted or oxy interrupted, or is carboxyl, $R^7$ is hydroxyl, amino, mono or di($C_1$–$C_{12}$)alkylamino, cyclohexylamino, $R^8$ is hydrogen, hydroxyl, amino, formylamino, acetylamino, $C_1$–$C_6$-alkyl, $R^9$ is hydrogen, $C_1$–$C_6$-alkyl, phenyl, hydroxyl, cyano, acetyl, benzoyl, methoxycarbonyl, carbamoyl, $R^{10}$ is hydrogen, chlorine, bromine, acetylamino, amino, nitro, sulfamoyl, methylsulfonyl, phenylsulfonyl, $C_1$–$C_4$-alkoxycarbonyl, $C_1$–$C_4$-alkanoyl, benzoyl, carbamoyl, cyano, N-methylimidazolyl, pyridinio, $R^{11}$ is hydrogen, $C_1$–$C_6$-alkyl with or without phenyl, hydroxyl, amino, $C_1$–$C_6$-alkoxy, acetylamino, benzoylamino or cyano substitution, cyclohexyl, phenyl with or without benzoylamino, acetylamino, methyl, methoxy, cyano or chlorine substitution, or amino which is substituted by phenyl, $C_1$–$C_6$-alkyl, $C_1$–$C_6$-alkanoyl or benzoyl, $R^{12}$ or $R^{13}$ are independently hydrogen or $C_1$–$C_6$-alkyl, $R^{14}$ is methyl, $C_1$–$C_4$-alkoxycarbonyl or phenyl, $R^{15}$ is hydrogen, $C_1$–$C_6$-alkyl, cyclohexyl, benzyl or phenyl which is unsubstituted or from singly to triply substituted by fluorine, chlorine, bromine, $C_1$–$C_4$-alkyl, $C_1$–$C_4$-alkoxy, cyano, acetyl, acetylamino, hydroxyl, sulfamoyl or carbamoyl.

$R^4$, $R^6$ and $R^7$ are each for example mono- or dimethylamino, mono- or diethylamino, mono- or dipropylamino, mono- or diisopropylamino, mono- or dibutylamino, mono- or dipentylamino, mono- or diisopentylamino, mono- or dineopentylamino, mono- or dihexylamino, mono- or di-2-methylpentylamino, N-methyl-n-butylamino, N-ethyl-n-butylamino.

$R^4$ may also be for example mono- or di(2-hydroxyethyl)amino, mono-or di(2-hydroxypropyl)amino, mono- or di(3-hydroxypropyl)amino, N-methyl-2-hydroxyethylamino, N-methyl-2-hydroxypropylamino, N-methyl-3-hydroxypropylamino, N-ethyl-2-hydroxyethylamino, N-ethyl-2-hydroxypropylamino, N-ethyl-3-hydroxypropylamino, N-propyl-2-hydroxyethylamino, N-propyl-2-hydroxypropylamino, N-propyl-3-hydroxypropylamino, N-isopropyl-2-hydroxyethylamino, -2-hydroxypropylamino, -3-hydroxypropylamino, mono- or di(2-aminoethyl)amino, mono- or di(2-aminopropyl)amino, mono- or di(3-aminopropyl)amino, mono- or di(2-aminobutyl)amino, mono- or di(4-aminobutyl)amino, 2-cyanoethylamino, 2-cyano-2-methylethylamino, 2-methoxycarbonylethylamino, 2-methoxycarbonyl-2-methylethylamino, 2-ethoxycarbonylethylamino, 2-ethoxycarbonyl-2-methylethylamino, 2-propoxycarbonylethylamino, 2-propoxycarbonyl-2-methylethylamino, 2-isopropoxycarbonylethylamino, 2-isopropoxycarbonyl-2-methylethylamino, 2-butoxycarbonylethylamino, 2-butoxycarbonyl-2-methylethylamino, 2-carbamoylethylamino, 2-carbamoyl-2-methylethylamino, 2-mono or dimethylaminocarbonylethylamino, 2-mono or dimethylaminocarbonyl-2-methylethylamino, mono or di(2-methoxyethyl)amino, mono or di(2-methoxypropyl)amino, mono-or di(3-methoxypropyl)amino, or mono or di(2-hydroxyethyloxyethyl)amino.

$R^5$, $R^6$, $R^8$, $R^9$, $R^{11}$, $R^{12}$, $R^{13}$ and $R^{15}$ are each for example methyl, ethyl, propyl, isopropyl, butyl, isobutyl, sec-butyl, tert-butyl, pentyl, isopentyl, neopentyl, tert-pentyl, hexyl or 2-methylpentyl.

$R^{11}$ is hydroxy-$C_1$–$C_4$-alkyl such as hydroxymethyl, 1-hydroxyeth-1-yl, 2-hydroxyeth-1-yl, 1-hydroxy-prop-1-yl, 2-hydroxyprop-1-yl, 3-hydroxyprop-1-yl, 1-hydroxy-prop-2-yl, 2-hydroxyprop-2-yl, 1-hydroxybut-1-yl, 2-hydroxybut-1-yl, 3-hydroxybut-1-yl, 4-hydroxybut-1-yl, 1-hydroxybut-2-yl, 2-hydroxybut-2-yl, 1-hydroxybut-3-yl, 2-hydroxybut-3-yl, 1-hydroxy-2-methyl-prop-3-yl, 2-hydroxy-2-methyl-prop-3-yl, 3-hydroxy-2-methyl-prop-3-yl, 2-hydroxymethyl-prop-2-yl, cyanomethyl, cyanoethyl, cyanopropyl or cyanobutyl.

$R^{11}$ may also be for example benzyl, 1-phenylethyl, 2-phenylethyl, 1-phenylprop-1-yl, 2-phenylprop-1-yl, 3-phenylprop-1-yl, 1-phenylbut-1-yl, 2-phenylbut-1-yl, 3-phenylbut-1-yl, 4-phenylbut-1-yl, 1-phenylbut-2-yl, 2-phenylbut-2-yl, 3-phenylbut-2-yl, 4-phenylbut-2-yl, 1-(phenylmethyl)-eth-1-yl, 1-(phenylmethyl)-1-(methyl)-eth-1-yl, 1-(phenylmethyl)-prop-1-yl, preferably benzyl and 2-phenylethyl, methoxymethyl, ethoxymethyl, n-propoxymethyl, (1-methylethoxy)methyl, n-butoxymethyl, (1-methylpropoxy)methyl, (2-methylpropoxy)methyl, (1,1-dimethylethoxy)methyl, 2-(methoxy)ethyl, 2-(ethoxy)ethyl, 2-(n-propoxy)ethyl, 2-(1-methoxyethoxy)ethyl, 2-(n-butoxy)ethyl, 2-(1-methylpropoxy)ethyl, 2-(2-methylpropoxy)ethyl, 2-(1,1-dimethylethoxy)ethyl, 2-(methoxy)propyl, 2-(ethoxy)propyl, 2-(n-propoxy)propyl, 2-(1-methylethoxy)propyl, 2-(n-butoxy)propyl, 2-(1-methylpropoxy)propyl, 2-(2-methylpropoxy)propyl, 2-(1,1-dimethylethoxy)propyl, 3-(methoxy)propyl, 3-(ethoxy)propyl, 3-(n-propoxy)propyl, 3-(1-methylethoxy)propyl, 3-(n-butoxy)propyl, 3-(1-methylpropoxy)propyl, 3-(2-methylpropoxy)propyl, 3-(1,1-dimethylethoxy)propyl, 2-(methoxy)butyl, 2-(ethoxy)butyl, 2-(n-propoxy)butyl, 2-(1-methylethoxy)butyl, 2-(n-butoxy)butyl, 2-(1-methylpropoxy)butyl, 2-(2-methylpropoxy)butyl, 2-(1,1-dimethylethoxy)butyl, 3-(methoxy)butyl, 3-(ethoxy)butyl, 3-(n-propoxy)butyl, 3-(1-methylethoxy)butyl, 3-(n-butoxy)butyl, 3-(1-methylpropoxy)butyl, 3-(2-methylpropoxy)butyl, 3-(1,1-dimethylethoxy)butyl, 4-(methoxy)butyl, 4-(ethoxy)butyl, 4-(n-propoxy)butyl, 4-(1-methylethoxy)butyl, 4-(n-butoxy)butyl, 4-(1-methylpropoxy)butyl, 4-(2-methylpropoxy)butyl or 4-(1,1-dimethylethoxy)butyl.

$R^{10}$ is for example formyl, acetyl, propionyl, butyryl or isobutyryl.

$R^6$ is for example mono- or dimethylcarbamoyl, mono- or diethylcarbamoyl, mono- or dipropylcarbamoyl, mono- or dibutylcarbamoyl, mono- or dipentylcarbamoyl or mono- or dihexylcarbamoyl.

$R^4$ and $R^6$ may each be for example methoxy, ethoxy, propoxy, isopropoxy, butoxy, sec-butoxy, isobutoxy or tert-butoxy.

$R^6$ may also be for example methoxyethyloxy, methoxypropyloxy, ethoxyethyloxy, ethoxypropyloxy or propoxypropyloxy.

$R^{15}$ is for example 2-, 3- or 4-fluorophenyl, 2-, 3- or 4-chlorophenyl, 2-, 3- or 4-bromophenyl, 2-, 3- or 4-methylphenyl, 2-, 3- or 4-ethylphenyl, 2-, 3- or 4-methoxyphenyl, 2-, 3- or 4-cyanophenyl, 2-, 3- or 4-hydroxyphenyl, 2-, 3- or 4-acetylphenyl, 2-, 3- or 4-acetylaminophenyl, 2-, 3- or 4-sulfamoylphenyl or 2-, 3- or 4-carbamoylphenyl.

$R^6$, $R^{10}$ and $R^{14}$ may each also be for example methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentoxycarbonyl, isopentoxycarbonyl, neopentoxycarbonyl, tert-pentyloxycarbonyl, hexyloxycarbonyl or 2-methylpentyloxycarbonyl.

$R^6$ may also be for example mono- or dimethylsulfamoyl, mono- or diethylsulfamoyl, mono- or dipropylsulfamoyl, mono- or dibutylsulfamoyl.

$R^{11}$ may also be for example aminomethyl, 2-aminoethyl, 2- or 3-aminopropyl, 2- or 4-aminobutyl, acetylaminomethyl, 2-acetylaminoethyl, 2- or 3-acetylaminopropyl, 2- or 4-acetylaminobutyl, benzoylaminomethyl, 2-benzoylaminoethyl, 2- or 3-benzoylaminopropyl, 2- or 4-benzoylaminobutyl, 2-, 3- or 4-benzoylaminophenyl, 2-, 3- or 4-acetylaminophenyl, 2-, 3- or 4-methylphenyl, 2-, 3- or 4-methoxyphenyl, 2-, 3- or 4-cyanophenyl, 2-, 3- or 4-chlorophenyl, phenylamino, methylamino, ethylamino, propylamino, isopropylamino, butylamino, isobutylamino, sec-butylamino, tert-butylamino, acetylamino, propionylamino, butyrylamino, isobutyrylamino, isobutyrylamino, valerylamino, isovalerylamino, pivaloylamino, pentylcarbonylamino or benzoylamino.

In what follows, coupling components KH are recited by way of example. Examples of coupling components of the benzene series are resorcinol, 2- and 4-methylresorcinol, 1,3-phenylenediamine, 3-aminophenol, 4-methyl-3-aminophenol, 5-amino-2-methylphenol, 4-ethyl-3-aminophenol, 3-N,N-diethylaminophenol, 2,4-diaminotoluene, 2,4-dihydroxybenzoic acid, 4-methyl-2-aminophenol, 3-acetaminophenol, 3-amino-4-hydroxybenzenesulfonamide, o-, m- or p-toluidine, o-, m- or p-xylidine, 2,5-dimethoxyaniline, 2-methoxy-5-methylaniline, 3-amino-4-methylacetanilide, 2- or 4-methoxyacetanilide, N-methylaniline, N-methyl-m-toluidine, N-ethylaniline, N,N-diethylaniline, E-ethyl-m-toluidine, N-(2-hydroxyethyl)aniline, N,N-dihydroxyethylaniline or N-(2-hydroxyethyl)-m-toluidine.

Coupling components of the naphthalene series are for example 1-naphthylamine, N-phenyl-1-naphthylamine, N-ethyl-1-naphthylamine, N-ethyl-2-naphthylamine, N-phenyl-2-naphthylamine, 1-naphthol, 2-naphthol, 2,5-dihydroxynaphthalene, 1,6-dihydroxynaphthalene, 1,7-dihydroxynaphthalene, 2,7-dihydroxynaphthalene, 2-hydroxynaphthalene-1-carboxylic acid, 2-hydroxynaphthalene-3-carboxylic acid, methyl 2-hydroxynaphthalene-3-carboxylate or 2-hydroxynaphthalene-3-carboxamide.

Coupling components of the quinoline series are for example 8-hydroxyquinoline, 8-hydroxy-2-methylquinoline, 8-aminoquinoline, 8-amino-2-methylquinoline, 2-hydroxyquinoline and 2,4-dihydroxyquinoline.

Pyridone coupling components are for example 1-ethyl-2-hydroxy-4-methyl-5-carbamoylpyrid-6-one, 1-(2'-hydroxyethyl)2-hydroxy-4-methyl-5-carbamoylpyrid-6-one, 1-phenyl-2-hydroxy-4-methyl-5-carbamoylpyrid-6-one, 1-ethyl-2-hydroxy-4-methyl-5-cyanopyrid-6-one, 1-methyl-2-hydroxy-4-methyl-5-cyanopyrid-6-one, 1-methyl-2-hydroxy-5-acetylpyrid-6-one, 1,4-dimethyl-2-hydroxy-5-cyanopyrid-6-one, 1,4-dimethyl-5-carbamoylpyrid-6-one, 2,6-dihydroxy-4-ethyl-5-cyanopyridine, 2-hydroxy-4-ethyl-5-carbamoylpyrid-6-one or 1-methyl-2-hydroxy-4-methylsulfonylpyrid-6-one.

Examples of suitable coupling components of the barbituric acid series are barbituric acid, dimethylbarbituric acid and diethylbarbituric acid.

Suitable pyrazolone coupling components are for example 3-methyl-or 3-($C_1$–$C_4$-alkoxycarbonyl)pyrazol-5-ones which, in 1-position, may bear hydrogen, unsubstituted or methyl-, ethyl-, fluorine-, chlorine-, bromine-, methoxy-, ethoxy-, cyano-, acetylamino-, hydroxyl-, carbamoyl- or sulfamoyl-substituted phenyl. Examples are 1-(2',5'-dichlorophenyl)-3-methylpyrazol-5-one, ethyl 1-phenylpyrazol-5-one-3-carboxylate and ethyl pyrazol-5-one-3-carboxylate.

Preference is given to dyes of the general formula I where $R^1$ and $R^2$ are each hydrogen.

Preference is further given to dyes where $A^1$ and $A^2$ on the one hand and $B^1$ and $B^2$ on the other are each the same radical.

$B^1$ and $B^2$ are each preferably $C_2$–$C_6$-alkylene with or without interruption by oxy or by $C_1$–$C_6$-alkylimino. $B^1$ and $B^2$ are preferably identical.

Coupling components KH are preferably compounds of the formulae IIIa and IIIb. Preference is given in particular to dyes of the general formula IV

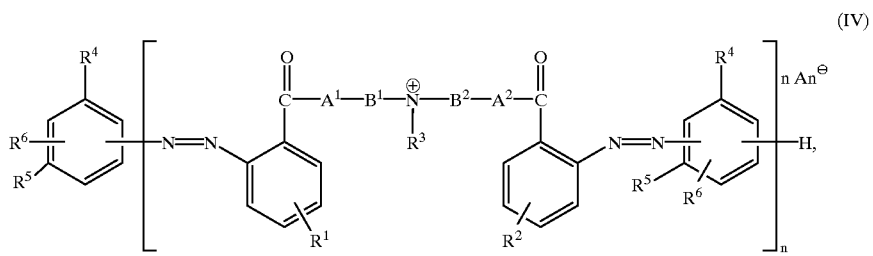

where n is from 1 to 8 and $R^1$, $R^2$, $R^3$, $R^4$, $R^5$, $R^6$, $A^1$, $A^2$, $B^1$, $B^2$ and $An^\ominus$ are each as defined above. Particular preference is given to coupling components of the formula IIIa where $R^4$ is hydroxyl, amino, mono- or dimethyl- or -ethylamino or mono- or dihydroxyethylamino and $R^5$ and $R^6$ are independently hydrogen, hydroxyl, amino or methyl.

Particular preference is likewise given to coupling components of the formula IIIb where $R^7$ is hydroxyl or amino.

Particular preference is given to the following coupling components: resorcinol, 3-aminophenol, m-phenylenediamine, α- and β-naphthol, m-toluidine and 2,5-dimethylaniline.

Preference is further given to dyes of the formula I where n is 1.

To prepare the dyes of the formula I, an amine of the formula V

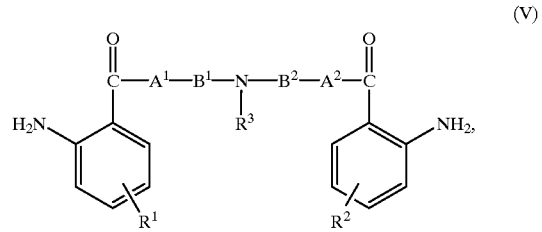

where $R^1$, $R^2$, $R^3$, $A^1$, $A^2$, $B^1$ and $B^2$ are each as defined above, can be conventionally diazotized and coupled with a coupling component KH. The pH is preferably within the range from 2 to 8.

Advantageously, the diazonium salt solution is metered into the solution of the coupling component. It is generally possible to use a single coupling component and also mixtures of a plurality of coupling components, for example so as to shade the hue.

By using coupling components capable of coupling twice it is possible to use the azo coupling reaction to obtain higher molecular weight dyes. These oligomeric dyes are obtainable by azo coupling of 1 mol equivalent of diamine of the formula IV onto from 1 to 2, preferably onto from 1 to 1.5, especially from 1 to 1.2, mol equivalents of a coupling component of the formula IIIa'

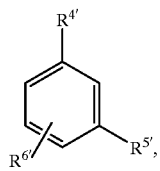

(IIIa')

where $R^{4'}$ and $R^{5'}$ are independently hydroxyl, amino, morpholino or mono-or di($C_1$–$C_6$)alkylamino, whose alkyl radicals are unsubstituted or substituted by hydroxyl, amino, cyano, $C_1$–$C_6$-alkoxycarbonyl, carbamoyl or mono- or di($C_1$–$C_6$)alkylcarbamoyl and uninterrupted or interrupted by oxy, and $R^{6'}$ is hydrogen, $C_1$–$C_6$-alkoxy with or without oxy interruption in its alkyl radical, mono- or di($C_1$–$C_6$) alkylamino, $C_1$–$C_6$-alkoxycarbonyl, carbamoyl, mono- or di($C_1$–$C_6$)alkylcarbamoyl, sulfamoyl, mono- or di($C_1$–$C_6$)alkylsulfamoyl.

The coupling step is carried out at a pH above 2, preferably within the range from 3 to 7. The desired pH may be set and, if necessary, corrected during the coupling reaction by adding, for example, ammonium or alkali metal bases, e.g., sodium hydroxide, sodium carbonate, sodium acetate, potassium hydroxide, potassium carbonate or potassium acetate. Usually, the end point of the reaction will be reached not more than 2 hours after completion of the addition. Chain termination is effected by coupling onto a coupling component devoid of a reactive terminus or by decomposing the diazonium compounds.

Depending on the choice of ratio for the starting materials, mixtures are obtained of various oligomers, among which the dimer fraction increases with increasing coupling component fraction. An approximately stoichiometric reaction of 1 mol of diamine V with 2 mol of coupling component IIIa' provides predominantly the preferred dyes where n is 1. Separation into the individual dyes is possible in principle, but generally unnecessary, since the mixtures are found to have good application properties.

Coupling a diazo component obtained by diazotizing an amine of the formula VI

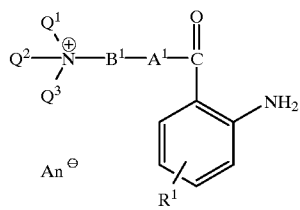

(VI)

onto disazo dyes IV provides likewise preferred tetraazo dyes.

The amines VI are generally known and are described for example EP-A-0 159 549.

The dyes are very useful in the production of pulp-dyed, sized and unsized paper. They are likewise useful for dyeing paper by the dip process.

The dyeing of paper, leather or cellulose takes place according to methods known per se.

The novel dyes and their preparations color the paper-making wastewater only minimally, if at all, which is particularly favorable from the aspect of keeping the water courses clean. They are highly substantive, do not marble on paper and are substantially pH-insensitive. The dyeings on paper are notable for good lightfastness. On prolonged exposure to light the hue changes on-tone.

The basic azo dyes of the formula I of the invention can be used alone, in mixtures with each or one another and together with other cationic or anionic compounds in the form of their solutions or in the form of powders or granules. They are advantageously useful for dyeing or printing polymeric material, especially papery materials such as paper and paperboard, but also cellulose, cotton, leather, bast fibers, hemp, flax, sisal, jute, coir, straw or anionically modified fibers and also in inks, including printing inks.

In relation to the production of dye preparations comprising the novel dyes of the formula I, the use of polymers, such as polyacrylic acids, polyacrylic acid derivatives, polyvinylamines, polyvinylamides, polyvinyl acetates, polyvinyl alcohols, polyvinylpyrrolidones, polysiloxanes or copolymers of the respective monomers, must be emphasized. Similarly, oligomers of ethyleneimine, ethylene oxide or propylene oxide or derivatives thereof can be used.

The dyed papers, which exhibit good bleachability, are wetfast, not only with regard to water, but also with regard to milk, soapy water, sodium chloride solutions, fruit juices or sweetened mineral water, and are also stable to alcoholic drinks because of their good alcohol fastness.

The novel dyes can also be used for dyeing, padding or printing polyacrylonitrile textiles or anionically modified polyamide or polyester textiles.

The Examples which follow illustrate the invention.

EXAMPLE 1 a) 119 g of N-methyldiethanolamine were dissolved in 215 ml of acetone and added dropwise to a suspension of 326 g of isatoic acid anhydride in 1000 ml of acetone at 50° C. over 30 minutes. The mixture was then refluxed for 5 hours before the solvent was removed under reduced pressure to leave 364 g of a viscid oil (crude product) which was purified by recrystallizing it from ethanol.

Yield: 256 g of white crystals, melting point: 68–69° C.

b) 3.6 g of the diamine prepared under 1a) were introduced into a mixture of 50 ml of ice-water and 6 ml of concentrated hydrochloric acid. 6.6 ml of 23% strength by weight sodium nitrite solution were then added dropwise at 0–5° C. This was followed by stirring at 0–50° C. for one hour before excess nitrite was destroyed by the addition of sulfamic acid. The diazonium salt solution was added dropwise to a solution of 2.2 g of resorcinol in 200 ml of water whilst a pH of 2 was set with 10% strength by weight aqueous sodium hydroxide solution and the temperature was maintained at 0–5° C. by addition of ice. On completion of the addition the batch was stirred at room temperature for 3 hours and pH 2 and then adjusted to pH 7 with 10% strength by weight aqueous sodium hydroxide solution. The batch was then allowed to warm to room temperature overnight, and the reddish orange precipitate formed was filtered off with suction, washed with water and dried at 60° C. under reduced pressure to leave 5.7 g of the dye of the formula

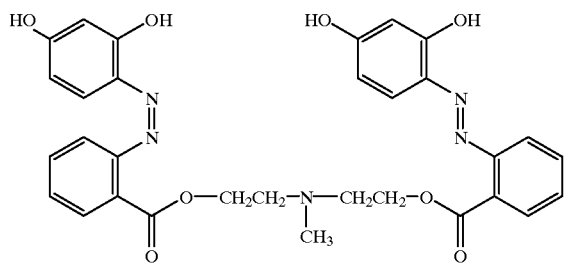

$\lambda_{max}$ (dilute acetic acid): 408 nm

Example 1 was repeated with the coupling components recited in Table 1 to prepare the dyes indicated in the table.

TABLE 1

| Ex. | Coupling component | $\lambda_{max}$ (nm) |
|---|---|---|
| 1.1 | OH / naphthalen-1-ol | 464 (NMP) |
| 1.2 | naphthalen-2-ol, OH | 476 (NMP) |
| 1.3 | 3-hydroxy-2-naphthoic acid (OH, CO$_2$H) | 502 (dilute acetic acid) |
| 1.4 | methyl 3-hydroxy-2-naphthoate (OH, CO$_2$CH$_3$) | 514 (dilute acetic acid) |
| 1.5 | 3-hydroxy-2-naphthamide (OH, CONH$_2$) | |

TABLE 1-continued

| Ex. | Coupling component | $\lambda_{max}$ (nm) |
|---|---|---|
| 1.6 | 3-hydroxy-N-(2-aminoethyl)-2-naphthamide (OH, NHCH$_2$CH$_2$NH$_2$) | 516 (dilute acetic acid) |
| 1.7 | 3-hydroxy-N-(2-hydroxyethyl)-2-naphthamide (OH, NHCH$_2$CH$_2$OH) | 516 (dilute acetic acid) |
| 1.8 | 3-methylaniline (H$_3$C, NH$_2$) | |
| 1.9 | 2,4-dimethylaniline (CH$_3$, H$_3$C, NH$_2$) | |
| 1.10 | N,N-diethylaniline (N(C$_2$H$_5$)$_2$) | |
| 1.11 | N,N-bis(2-hydroxyethyl)aniline (N(CH$_2$CH$_2$OH)$_2$) | |
| 1.12 | 3-aminophenol (HO, NH$_2$) | 418 (dilute acetic acid) |
| 1.13 | 3-amino-N-methylaniline (H$_2$C, NH$_2$) | 440 (dilute acetic acid) |
| 1.14 | 4-methyl-3-cyano-2,6-dihydroxypyridine (H$_3$C, CN, OH, HO, N) | |
| 1.15 | imidazolium-pyridine derivative (H$_3$C, CH$_3$, OH, HO, N) | 410 (dilute acetic acid) |

TABLE 1-continued

| Ex. | Coupling component | $\lambda_{max}$ (nm) |
|---|---|---|
| 1.16 | 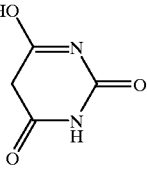 | |

EXAMPLE 2

2.1 g of 2-dimethylaminoethyl 2-aminobenzoate were introduced into a mixture of 20 ml of ice-water and 3 ml of concentrated hydrochloric acid, before 3.3 ml of 23% strength by weight sodium nitrite solution were added dropwise at 0–5° C. The batch was subsequently stirred at 0–5° C. for one hour before excess nitrite was destroyed by addition of sulfamic acid. The diazonium salt solution was added to a solution of 3 g of the dye of Example 1b in 50 ml of ice-water and 20 ml of glacial acetic acid whilst the pH was maintained at 5–6 with 10% strength by weight aqueous sodium hydroxide solution. On completion of the addition the reaction mixture was allowed to warm up to room temperature overnight and then adjusted to pH 7. After stirring for one hour, the brown precipitate was filtered off with suction, washed with water and dried at 60° C. under reduced pressure to leave 5.0 g of the dye of the formula The method of Example 2 was also suitable for reacting the dyes of Examples 1.12 and 1.13 with diazotized 2-dimethylaminoethyl 2-aminobenzoate.

EXAMPLE 3

3.6 g of the diamine prepared under 1a) were introduced into a mixture of 50 ml of ice-water and 6 ml of concentrated hydrochloric acid before 6.6 ml of 23% strength sodium nitrite solution were added dropwise at 0–5° C. The batch was subsequently stirred at 0–50° C. for one hour before excess nitrite was destroyed by addition of sulfamic acid. The diazonium salt solution was then added dropwise to a solution of 1.1 g of resorcinol in 100 ml of water whilst a pH of 10 was set by simultaneous addition of 10% strength by weight aqueous sodium 40 hydroxide solution and the temperature was maintained at 0–5° C. by addition of ice. On completion of the addition the batch was stirred at 0–5° C. and pH 10 for 10 minutes before being adjusted to pH 7 with concentrated hydrochloric acid. The mixture was allowed to warm to room temperature overnight, and the resulting reddish orange precipitate was filtered off with suction, washed with water and dried at 60° C. under reduced pressure to leave 4.8 g of an oligomeric dye containing the repeat unit

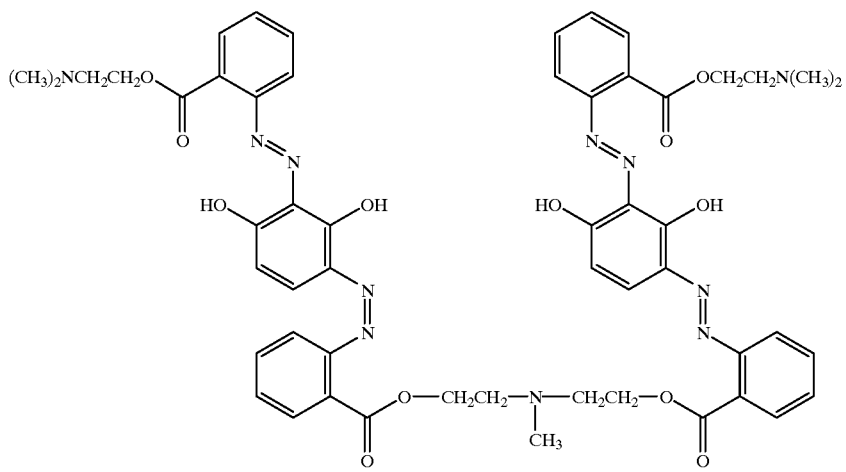

$\lambda_{max}$ (dilute acetic acid): 410 nm

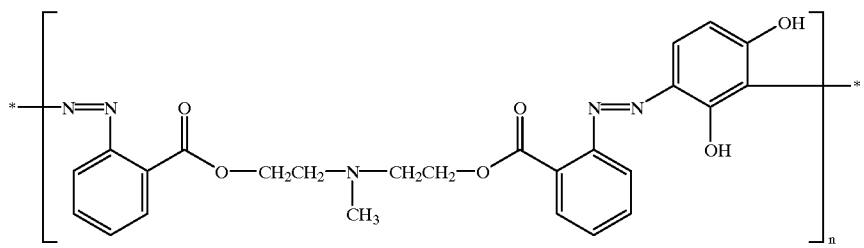

$\lambda_{max}$ (dilute acetic acid): 412 nm

We claim:

1. A cationic dye of formula I

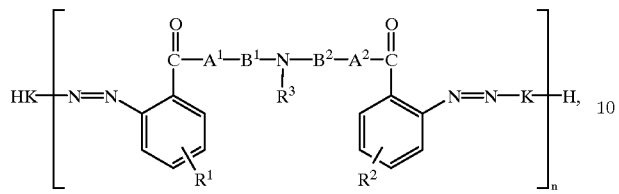

where

R$^1$ and R$^2$ are independently hydrogen, nitro, halogen, C$_1$–C$_6$-alkyl,

R$^3$ is hydrogen, C$_1$–C$_6$-alkyl with or without interruption by 1 or 2 nonadjacent oxy, imino, C$_1$–C$_6$-alkylimino groups or by a

radical,

A$^1$ and A$^2$ are independently oxy, imino or substituted or unsubstituted C$_1$–C$_6$-alkylimino, B$^1$ and B$^2$ are independently C$_1$–C$_6$-alkylene with or without interruption by 1 or 2 nonadjacent oxy, imino, substituted or unsubstituted Cl$_{1-6}$-alkylimino groups or by a

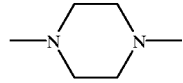

radical, n is 1, and

K is the radical of a coupling component or the radical of a monoazo dye of the formula

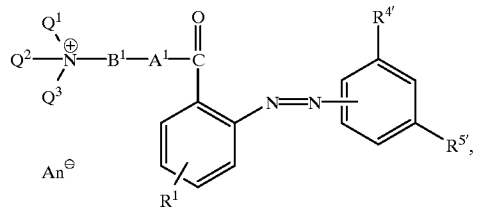

where

R$^{4'}$ and R$^{5'}$ are independently hydroxyl, amino, morpholino or mono- or di(C$_1$–C$_6$)alkylamino, whose alkyl radicals are unsubstituted or substituted by hydroxyl, amino, cyano, C$_1$–C$_6$-alkoxycarbonyl, carbamoyl or mono- or di(C$_1$–C$_6$)alkylcarbamoyl and uninterrupted or interrupted by oxy, Q$^1$, Q$^2$ and Q$^3$ are independently hydrogen, C$_1$–C$_{10}$-alkyl with or without interruption by from 1 to 4 nonadjacent oxy, imino and substituted or unsubstituted C$_1$–C$_4$-alkylimino groups and with or without hydroxyl, halogen or phenyl substitution, or Q$^1$ and Q$^2$ combine with the linking nitrogen atom to form a 5- or 6-membered heterocyclic radical which optionally contains nitrogen or oxygen as further hetero atom, and An$^\ominus$ is the equivalent of an anion, and additionally n is from 2 to 8 when K is the radical of a coupling component of the formula IIIa'

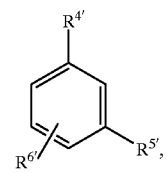

where

R$^{6'}$ is hydrogen, C$_1$–C$_6$-alkoxy with or without oxy interruption in its alkyl radical, mono- or di(C$_1$–C$_6$)alkylamino, C$_1$–C$_6$-alkoxycarbonyl, carbamoyl, mono- or di(C$_1$–C$_6$))alkylcarbamoyl, sulfamoyl, mono- or di(C$_1$–C$_6$)alkylsulfamoyl.

2. The cationic dye as claimed in claim 1, wherein n is 1.

3. The cationic dye as claimed in claim 1 represented by formula IV

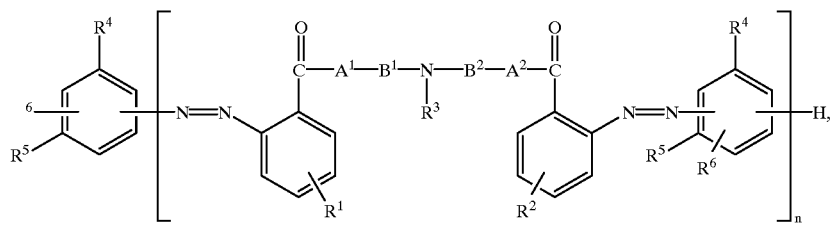

where n is from 1 to 8 and $R^1$, $R^2$, $R^3$, $R^4$, $R^5$, $R^6$, $A^1$, $A^2$, $B^1$, and $B^2$ are each as defined in claim 1.

4. The cationic dye as claimed in claim 1, wherein each of $A^1$ and $A^2$; and each of $B^1$ and $B^2$ are each the same radical.

5. The cationic dye as claimed in claim 1, obtainable by azo coupling of 1 mol equivalent of diamine of the formula V

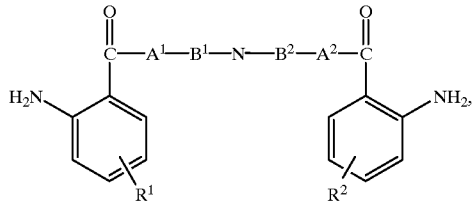

(V)

where $R^1$, $R^2$, $R^3$, $A^1$, $A^2$, $B^1$ and B2 are each as defined in claim 1, with from 1 to 2 mol equivalents of a coupling component of the formula IIIa'

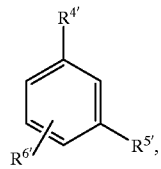

(IIIa')

where $R^{4'}$, $R^{5'}$ and $R^{6'}$ are each as defined in claim 1.

6. The cationic dye as claimed in claim 1, obtainable by azo coupling of 1 mol equivalent of diamine V with from 1.5 to 2 mol equivalents of a coupling component IIIa'.

7. A process for preparing the cationic dye as claimed in claim 1, comprising:
   diazotizing one or more diamines V and coupling the diazonium salt onto one or more coupling components IIIa'.

8. A dye mixture, comprising:
   a plurality of dyes of the formula I according to claim 1 which differ in the number of their repeat units.

9. A method of dyeing or printing a polymeric material comprising:
   applying a cationic azo dye as claimed in claim 1 to said polymer material.

* * * * *